US010337501B2

(12) United States Patent
Galdos Tobalina (10) Patent No.: US 10,337,501 B2
(45) Date of Patent: Jul. 2, 2019

(54) FLOATING PLATFORM FOR HARNESSING WIND ENERGY

(71) Applicant: SAITEC OFFSHORE TECHNOLOGIES S.L.U., Leioa Vizcaya (ES)

(72) Inventor: Alberto Galdos Tobalina, Leioa Vizcaya (ES)

(73) Assignee: SAITEC OFFSHORE TECHNOLOGIES S.L.U., Leioa Vizcaya (ES)

( * ) Notice: Subject to any disclaimer, the term of this patent is extended or adjusted under 35 U.S.C. 154(b) by 157 days.

(21) Appl. No.: 15/527,218

(22) PCT Filed: Sep. 23, 2015

(86) PCT No.: PCT/ES2015/070691
§ 371 (c)(1),
(2) Date: May 16, 2017

(87) PCT Pub. No.: WO2016/083634
PCT Pub. Date: Jun. 2, 2016

(65) Prior Publication Data
US 2017/0356423 A1 Dec. 14, 2017

(30) Foreign Application Priority Data
Nov. 26, 2014 (ES) .................................. 201431758

(51) Int. Cl.
*F03D 13/25* (2016.01)
*B63B 35/44* (2006.01)
(Continued)

(52) U.S. Cl.
CPC .............. *F03D 13/25* (2016.05); *B63B 35/44* (2013.01); *F03D 7/0204* (2013.01); *F03D 9/30* (2016.05);
(Continued)

(58) Field of Classification Search
CPC .......... F03D 13/25; F03D 9/30; F03D 7/0204; B63B 35/44
See application file for complete search history.

(56) References Cited

U.S. PATENT DOCUMENTS

2011/0155038 A1* 6/2011 Jahnig .................... B63B 1/107
114/264
2012/0103244 A1 5/2012 Gong et al.

FOREIGN PATENT DOCUMENTS

CN 103758147 A1 * 2/2014
DE 2010058 A1 12/1971
(Continued)

OTHER PUBLICATIONS

Than, Kher. "Floating Ocean Windmills Designed to Generate More Power." Livescience, Sep. 18, 2006, www.livescience.com/7183-floating-ocean-windmills-designed-generate-power.html.*
(Continued)

*Primary Examiner* — Kevin A Lathers
(74) *Attorney, Agent, or Firm* — Lucas & Mercanti, LLP (57) ABSTRACT

The invention relates to a floating platform for harnessing wind energy, comprising a tower (1) with a wind turbine (2), and two horizontal, identical cylindrical floating elements (3) parallel to the main longitudinal axis of alignment, the tower and the floating elements being interconnected by bar structures (5). The floating elements are joined to a stabilising element (4) which is situated directly beneath the floating elements (3), said stabilising element comprising two substantially rectangular first concrete slabs (4a), which are solid or more lightweight, with a ribbed structure, arranged perpendicularly to the axes of the floaters and joined to said floaters by means of auxiliary structures.

9 Claims, 6 Drawing Sheets

(51) Int. Cl.
  *F03D 9/30* (2016.01)
  *F03D 7/02* (2006.01)
(52) U.S. Cl.
  CPC ..... *B63B 2035/446* (2013.01); *F05B 2240/93* (2013.01); *F05B 2240/95* (2013.01); *Y02E 10/727* (2013.01)

(56) References Cited

FOREIGN PATENT DOCUMENTS

| | | |
|---|---|---|
| DE | 19727330 A1 | 1/1999 |
| DE | 19846796 A1 | 4/2000 |
| ES | 2440894 A1 | 1/2014 |
| JP | 2004251139 A | 9/2004 |
| WO | 01/73292 A1 | 10/2001 |
| WO | 02/10589 A1 | 2/2002 |
| WO | 2010106208 A2 | 9/2010 |
| WO | 2012013116 A1 | 2/2012 |
| WO | 2013093160 A1 | 6/2013 |

OTHER PUBLICATIONS

International Search Report dated Nov. 23, 2015 for PCT/ES2015/070691.

* cited by examiner

FLOATING PLATFORM FOR HARNESSING WIND ENERGY

CROSS-REFERENCE TO RELATED APPLICATION

This Application is a 371 of PCT/ES2015/070691 filed on Sep. 23, 2015, which claims priority of Spanish Application No. P201431758 filed Nov. 26, 2014, both of which are incorporated herein by reference.

OBJECT OF THE INVENTION

The object of the present invention is a floating platform for harnessing wind energy incorporating notable innovations and advantages over the techniques used so far.

More specifically, the invention proposes the development of a floating platform for harnessing wind energy which, because of its particular arrangement, allows for a highly significant reduction of costs with respect to the prototypes currently under development, and which could better be used because of its reduced draft, both in shallow and in deep waters, and it can also be manufactured and transported very easily.

STATE OF THE ART

Harnessing wind energy for generating electric energy by means of wind turbines, the development of which has been a high priority in recent years mainly by means of land-based wind farms, is known in the current state of the art.

Environmental problems associated with land-based wind turbines, as well as the greater energy potential of wind on the surface of the sea, have led to the study of the deployment of wind turbines on the waters of coastal areas, either by attaching them directly to the seabed, when at shallow depths, or installing them on several different types of floating platforms which are fixed at their locations by means of different anchoring systems.

The types of floating platforms for supporting wind turbines currently being developed generally stem from those already being used in the offshore oil and gas sector, which have strict stability requirements and respond to the action of waves with very small movements.

Specifically, and taking into account the basic strategy for achieving proper stability and limited movements, the following three groups can be distinguished:

Platforms mainly stabilised by mooring lines.

Tensioned mooring lines fix the platform to the seabed and practically immobilize it, thus achieving stability. The disadvantage of this type of stabilization, however, lies in the fact that it requires auxiliary flotation systems during transportation and involves complex operations for positioning and fixing the platforms to the seabed, in addition to the steep costs associated with the installation.

Platforms mainly stabilised by ballasting.

These platforms are characterised by having a reduced surface on the water plane area in order to reduce the action of the waves on the platform and the corresponding movements produced as a result thereof, the floating elements being practically submerged once positioned at the site, and they also have a strong ballast to lower the position of the center of gravity thus achieving proper stability.

The simplest type of this group is made up of a single vertical cylindrical flotation element of great length, the wind turbine being located on its upper part and with the ballast in its lower part in order to lower the position of the center of gravity, as in the SPAR buoys. The HYWIND design by STATOIL is a representative example, there existing other patents with identical types, such as WO 2010/106208 and WO 2013/093160. Patent WO 2012/13116 is a variant, which has a horizontal cantilever element on the lower part of the floating vertical cylinder, and the anchoring system fixed to the end thereof, enabling it to be oriented with the wind.

Among this type of platforms there is also that which is described in patent ES 2 440 894A1 belonging to the same applicant as that of the present invention, comprising: at least two floating cylinders, a bracing structure simultaneously joined to the floaters, a wind turbine tower positioned on and fixed to the floaters and/or the bracing structure. Said platform comprises a concrete counter-weight fixed to the same by means of an auxiliary structure projected towards the lower area and which substantially increases the draft of the platform.

The main disadvantages of these types of platforms are the large draft and the complex transportation and installation operations, as well as the high costs.

Semi-submersible platforms can also be included in this group, since they have a reduced surface on the water plane area, corresponding to the vertical columns that support the wind turbine, the greater part of the floating elements generally being submerged.

Stability is achieved by distancing the columns in order to increase the metacentric height, and by using additional ballast in order to position the center of gravity below the metacentre.

Multiple variants have been developed, generally made up of several vertical cylindrical floating elements braced together. The WINDFLOAT and TRI-SYM types, or the type described in patent DE 2010058, are some examples of semi-submersible platforms with three vertical cylinders.

Patent US 2012/0103244 corresponds to a semi-submersible platform with four vertical buoyant columns, three of which are arranged on the vertices of an equilateral triangle and the fourth in the center, which supports the tower of the wind turbine.

Patent WO 2002/10589 presents a type of semi-submersible platform with a central flotation chamber and a tensioned vertical anchoring cable, which is also central, in addition to an additional system of anchoring lines, so it can be classified as a combination of semi-submersible and stabilised by tensioned anchoring lines type platform.

Moreover, patent US 2011/0155038 proposes a platform type with three or more floating vertical cylinders, joined to the seabed by tensioned cables.

These semi-submersible platforms also have disadvantages with regard to their draft, which is usually high, due to the complexity of maritime transportation and installation operations, as well as a high cost.

Platforms mainly stabilised by flotation.

To achieve a reduced draft, it is necessary to do without the ballast as much as possible, with the option of achieving stability by means of a large surface on the level of the water plane, so as to maintain the position of the metacentre above the center of gravity, as in the case of barges. Furthermore, there is the added challenge of achieving the geometry and the physical characteristics, which enable the platform to have its own oscillation periods sufficiently distant from the wave periods in order to reduce said wave-induced movements as much as possible.

In the case of barges with a mooring system that maintains their position and permanently and substantially fixed orientation by means of a distributed system of mooring lines, the action of the wind and the waves can act upon any horizontal axis of the same, which is why they must have similar inertial or response characteristics for all directions. Pillbox type floaters, with a square or circular horizontal cross section, or those corresponding to patent JP2004251139, with a monohull floater in the form of an O-ring, are suitable for this approach.

There is also the possibility that the barges are positioned through moorings to a fixed point, able to rotate around the same, like a weather vane, in order to align with the wind, in which case they would receive the action of the waves and the wind preferably in one direction, which is why it is worth considering configurations with inertial and response characteristics that are very different depending on the main horizontal longitudinal axis of alignment and the perpendicular alignment to the same on the horizontal plane.

Although these types are viable when considering their stability, in contrast and simultaneously, the oscillation periods around the horizontal axes are at the maximum energy band of the wave spectrums, resulting in movements at the turbine level, which are incompatible with operating requirements, and therefore these types have been considered technically inadequate.

With regard to the materials used, practically all of the floating platforms proposed to date are made of steel, in spite of the fact that concrete is a much more durable and affordable material. It is true, however, that concrete also has certain drawbacks, such as its weight, the complete or practically complete lack of tensile strength and the cracking thereof when subjected to bending stress, which is why its use is limited to cases in which weight is an advantage, or in which it is not a determining factor, for the stability and structural elements which work mainly by compression.

The present invention contributes to solving the current problem with a specific type of platform for harnessing wind energy and its corresponding anchoring system, which allows for a simple, practical and affordable construction, installation, use and maintenance thereof.

DESCRIPTION OF THE INVENTION

The present invention has been developed with the aim of providing a floating platform for harnessing wind energy, of the type that uses a wind turbine for generating energy, and which falls within the group of offshore platforms that obtain stability entirely by floatation, the positioning of which is carried out through mooring to a fixed point, around which the platform can rotate in order to align with the wind.

This platform is of the type described in the pre-characterising part of Claim 1, comprising a tower with a wind turbine, two horizontal, identical cylindrical floating elements parallel to the main longitudinal axis of alignment, the tower and the floating elements being interconnected by bar structures. The floating elements are joined to a stabilising element beneath the floating elements.

As indicated in the previous section, the main problem facing platforms stabilised by flotation is achieving a geometry, which, along with having acceptable stability, also achieves its own periods sufficiently distant from the periods of incident swell.

The invention proposes the combination of a twin hull platform, with two horizontal, identical cylindrical floating elements with an ovoid cross section and which are closed at their ends, thereby allowing for greater transverse stability with respect to a monohull solution with the same flotation surface, and with a submerged stabilising element which has characteristics aimed at reducing wave-induced movements as much as possible and drastically reducing the draft of the platform.

The aforementioned stabilising element is substantially flat, it is situated beneath the floating elements and comprises two substantially rectangular first concrete slabs, either solid or more lightweight, with a ribbed structure, arranged perpendicularly to the axes of the floaters and joined to said floaters by means of auxiliary structures, coplanar with said first concrete slabs.

Said stabilising element enables to greatly increase the pitch period of the platform, partly due to the inertia of the mass of the slabs and partly due to the inertia of the added hydrodynamic mass associated therewith.

If it is also necessary to limit the oscillations in the transverse direction to the axis of the cylinders, it is provided that the stabilising element may comprise two second substantially rectangular concrete slabs arranged parallel to the axes of the floaters at their outer lower part and joined to them by means of auxiliary structures that would limit the aforementioned movements in the same way.

With the aim of reducing manufacturing and maintenance costs, both the floating and the stabilising elements are made of reinforced or prestressed concrete. Concrete structures have the aforementioned problem of heavy weight, extremely low tensile strength or the presence of cracks due to intense bending stress. The problem of excess weight is not serious, given that with the developed configuration, the centre of gravity can be lowered and positioned well below the metacentre, which largely increases stability, while at the same time maintaining a reduced draft because they are hollow floaters with relatively thin walls.

Another characteristic of the invention is that the floating elements have an ovoid cross section and are closed at their ends by a convex form. This geometry causes that when the floating elements are subjected to hydrostatic pressure they compress, such that the concrete that forms part of the same works by compression and prevents it from cracking. Moreover, in order to further ensure said compression of the cylinders, they are subjected to pre-compression, using the technique of prestressed concrete, while at the same time they are compartmentalised and internally stiffened by transverse partitions or bulkheads.

Preferably, in the floating platform for harnessing wind energy, the assembly of bars is made of reinforced or prestressed concrete.

In an alternative embodiment, in the floating platform for harnessing wind energy, the assembly of bars is made of steel.

In another alternative embodiment, in the floating platform for harnessing wind energy, the assembly of bars is made of a mixture of steel and concrete.

Additionally, the floating platform incorporates a buoy, said buoy being provided with anchoring means on the seabed comprising at least three mooring lines with their corresponding anchors and/or concrete blocks and/or piles for fastening to the seabed, as well as electrically transmitted rotating means comprising a swivel connector positioned on the buoy itself or on the platform and a cable, the cable coming from the seabed and reaching the platform itself, and rotating means for mooring, comprising a swivel joint to which the moorings of the platform are joined. The explained arrangement allows for the rotation of the platform of the invention around the buoy in order to align itself with the wind, like a weather vane, which allows the longitudinal oscillations of pitching and the transversal oscillations of rocking to be treated as separate phenomena and be optimised depending on their impact on the operation of the wind turbine.

Thanks to the present invention, the construction of a platform for harnessing wind energy positioned in and adapted to a marine environment is made simple, practical, affordable and effective.

The platform of the invention provides an unprecedented solution that satisfactorily solves all of the aforementioned problems, obtaining a specific type of floating platform for harnessing wind energy that meets the requirements of a reduced draft, as well as that of stability and wave-induced movements that are suitable for the wind turbine and its tower, both in normal environmental operating conditions and in extreme environmental conditions, and all at a reduced cost.

Other characteristics and advantages of the floating platform for harnessing wind energy will become apparent from the description of a preferred, but non-exclusive, embodiment, which, by way of a non-limiting example, is illustrated in the accompanying drawings, wherein:

DESCRIPTION OF THE PREFERRED EMBODIMENT

Figure 1:
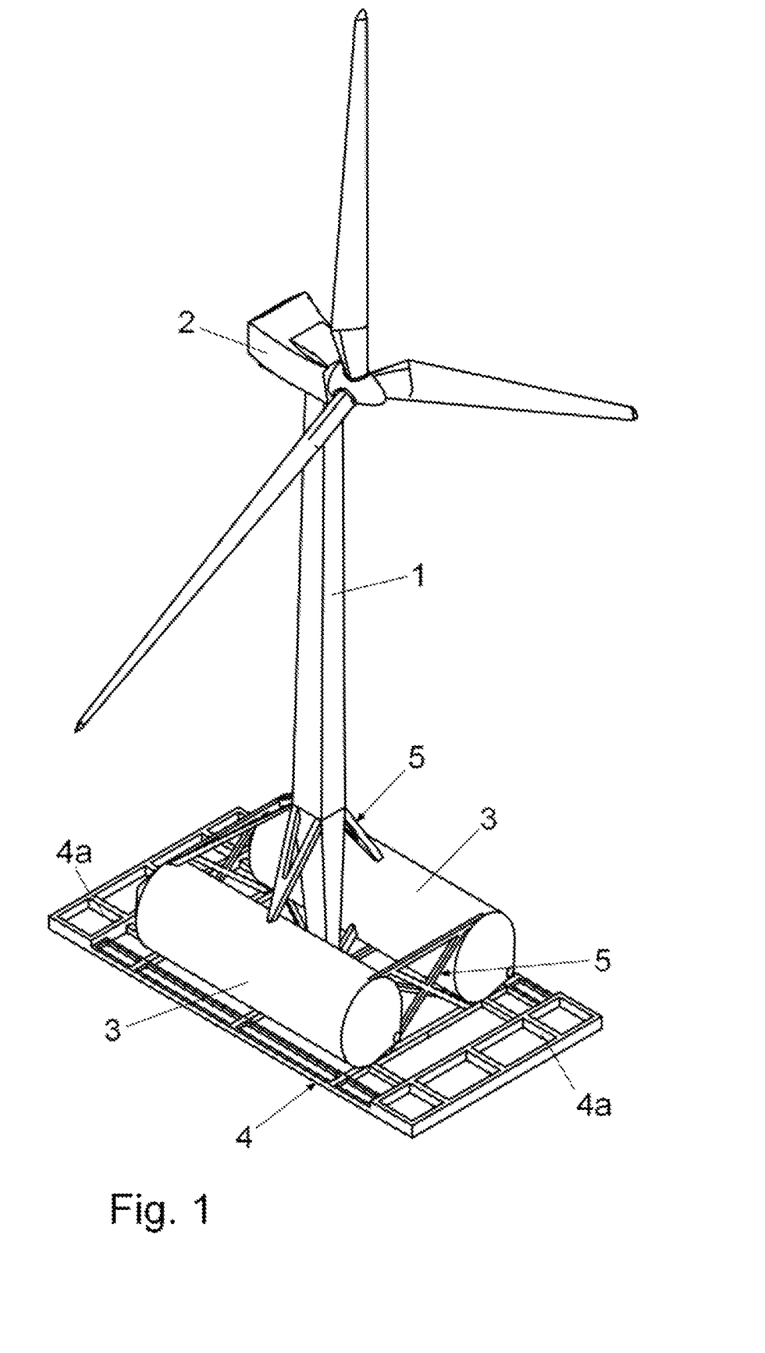
FIG. 1 is a schematic and perspective view of a preferred embodiment of the floating platform for harnessing wind energy of the present invention.

As shown schematically in FIG. 1, the floating platform for harnessing wind energy using a wind turbine to generate energy, comprises a tower (1) with a wind turbine (2), floating elements (3), a stabilising element (4) and an assembly of bars (5).

The tower (1) and the floating elements (3) are interconnected by bar structures (5) and, simultaneously, the same bar structures (5) are linked to the floating elements (3), running between them.

The floating elements (3) are horizontal, identical cylindrical and parallel with an ovoid transverse cross section, in addition to being compartmentalised and internally stiffened with transverse partitions and bulkheads.

In this preferred exemplary embodiment, the floating elements, the tower and the bar assembly are made of reinforced or pre-stressed concrete.

In this preferred exemplary embodiment in FIG. 1, the floating elements (3) have essentially conical ends.

Figure 2:
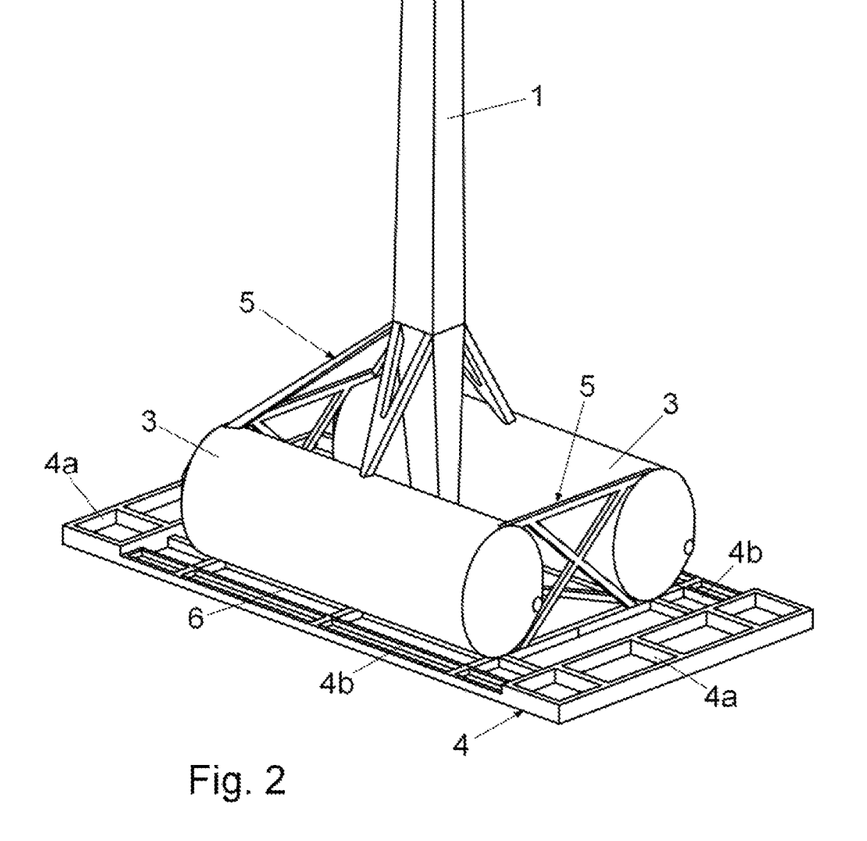
FIGS. 2, 3 and 4 show schematic perspective views of a preferred embodiment of the floating platform for harnessing wind energy of the present invention, in greater detail.
Figure 3:
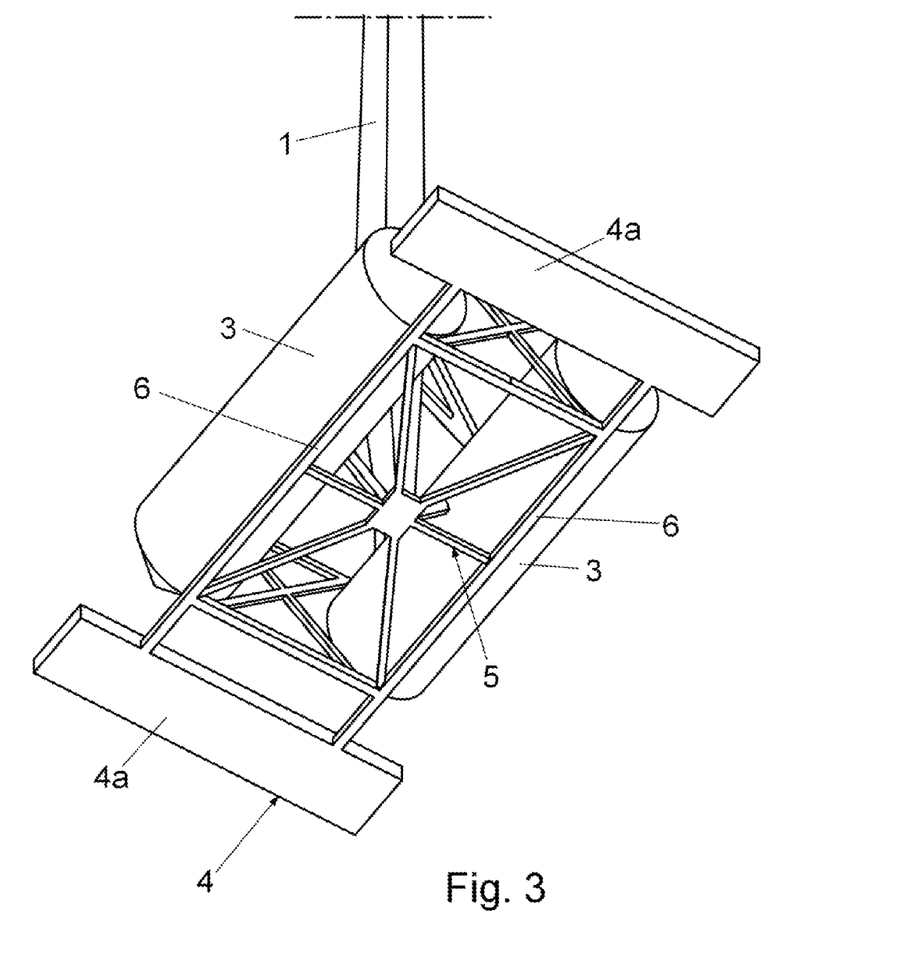
Figure 4:
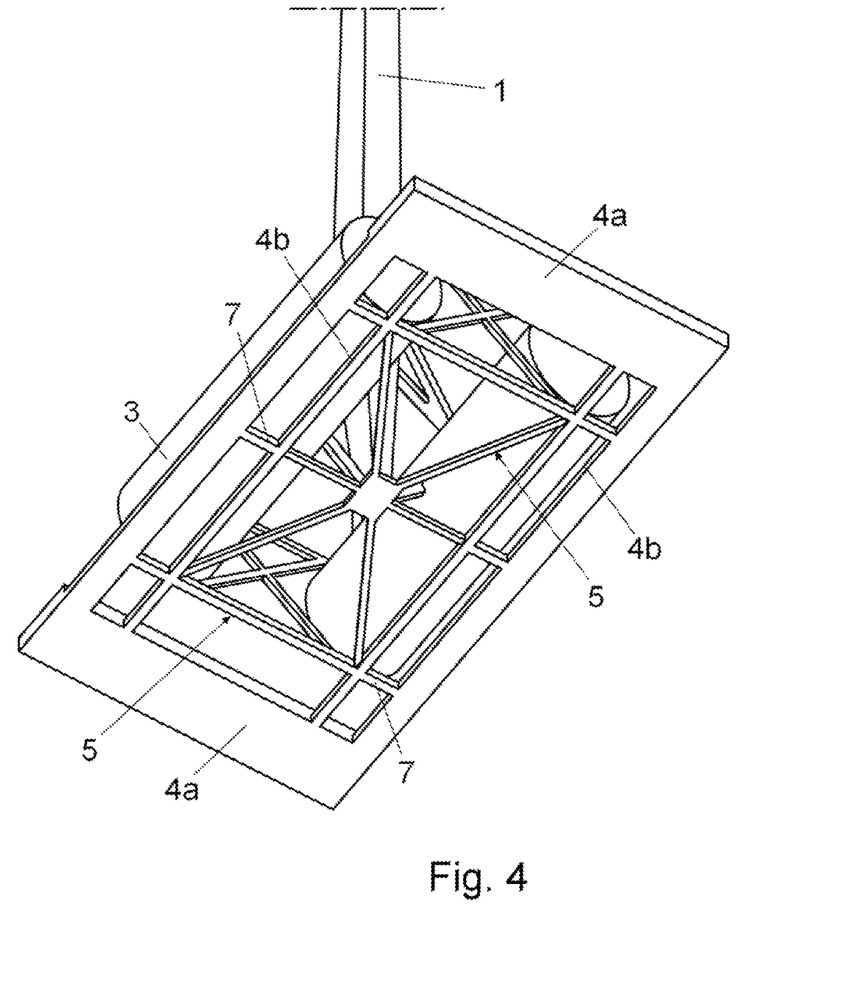

As can be seen in the schematic representation in FIGS. 2 and 3, the floating elements (3) have a lower longitudinal stiffening rib (6), as a keel.

Also shown in FIG. 2 is how the floating elements (3) incorporate a substantially horizontal and flat submerged stabilising element (4) made up of four substantially rectangular slabs: two first slabs (4a) more lightweight and with a ribbed structure, arranged perpendicularly to the axes of the floating elements (3) at the ends and lower part thereof, and two second slabs (4b), also more lightweight and with a ribbed structure, positioned parallel to the axes of the floating elements (3) on the outer lower part thereof.

This stabilising element (4) is joined to the floating elements (3) by means of auxiliary bar structures (7). In this preferred exemplary embodiment, said slabs are made of reinforced or pre-stressed concrete.

Figure 5:
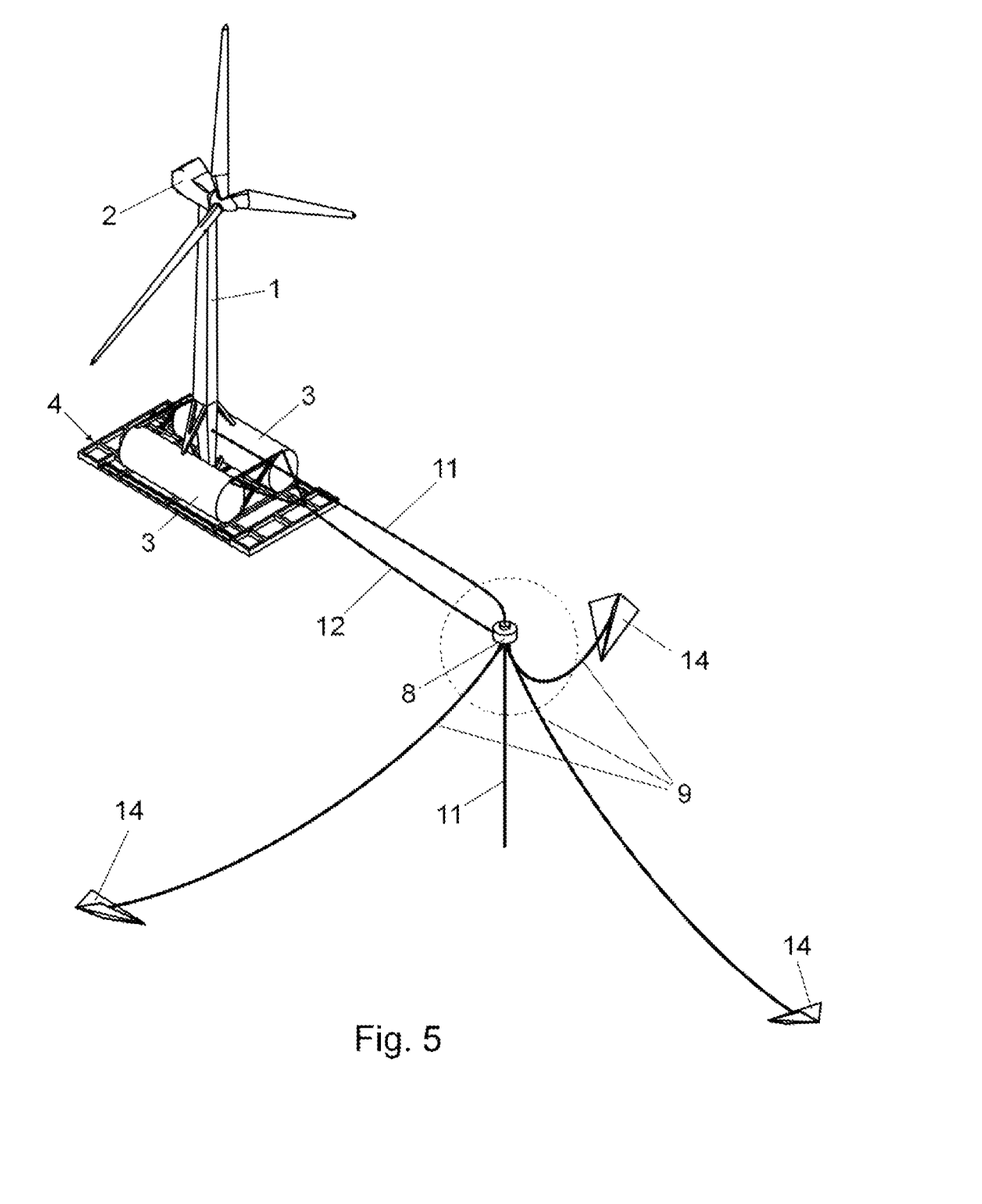
FIG. 5 is a schematic and perspective view of a preferred embodiment of the floating platform for harnessing wind energy of the present invention incorporating a buoy.
Figure 6:
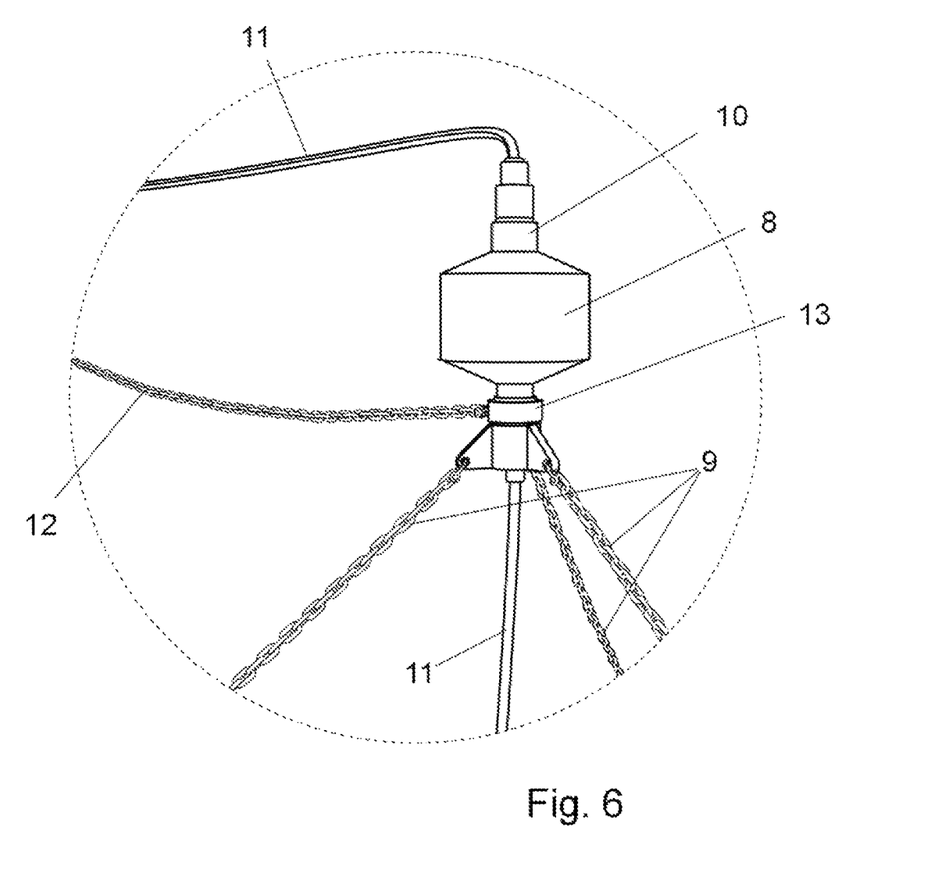
FIG. 6 is a schematic perspective view of a preferred embodiment of the floating platform for harnessing wind energy of the present invention incorporating a buoy, in greater detail.

As shown in the schematic representation of FIGS. 5 and 6, the floating platform for harnessing wind energy of the invention may incorporate a buoy (8) added to the platform of the invention, said buoy (8) being provided with anchoring means on the seabed, electrically transmitted rotating means and rotating means for mooring.

In the preferred embodiment shown schematically in FIGS. 5 and 6, the anchoring means on the seabed comprise three mooring lines (9) with their corresponding anchors (14) and/or concrete blocks and/or piles for the fastening thereof to the seabed, the electrically transmitted rotating means comprise a swivel connector (10) and a cable (11), the cable (11) coming from the seabed and reaching the platform of the invention, and the rotating means for mooring comprise a swivel joint (13), to which the moorings (12) of the platform itself are joined.

In this exemplary embodiment, the swivel connector is positioned on the buoy (8) itself.

The platform described is easily constructed and can be transported without difficulty by means of towing due to its reduced draft and the configuration of its floating hulls for navigation.

The details, shapes, dimensions and other accessory elements, as well as the materials used to manufacture the floating platform for harnessing wind energy of the invention, may be suitably substituted for others which are technically equivalent, and do not diverge from the essential nature of the invention, nor the scope defined by the claims included below.

The invention claimed is:

1. A floating platform for harnessing wind energy, comprising
   a tower with a wind turbine;
   two horizontal, identical cylindrical floating elements made of reinforced or pre-stressed concrete, parallel and closed at their ends; and
   bar structures linking the tower to the floating elements, wherein a flat stabilising element is joined to and situated directly beneath the floating elements, said stabilising element comprising two substantially rectangular first concrete slabs, with a ribbed structure, arranged perpendicularly to the axes of the floating elements and joined to said floating elements by means of auxiliary structures.

2. The floating platform according to claim 1, wherein the stabilising element comprises two substantially rectangular second concrete slabs, with a ribbed structure, arranged parallel to the axes of the floating elements on an outer part thereof and joined to said floating elements by means of auxiliary structures.

3. The floating platform according to claim 1, wherein the floating elements have an ovoid shaped cross section, are closed at their ends by means of a convex form and are compartmentalised and internally stiffened with transverse partitions or bulkheads.

4. The floating platform according to claim 1, wherein the bar structures and the tower are made of reinforced or pre-stressed concrete.

5. The floating platform according to claim 1, wherein the bar structures and the tower are made of steel.

6. The floating platform according to claim 1, wherein the bar structures and the tower are made of a mixture of steel and concrete.

7. The floating platform according to claim 1, further comprising a buoy provided with anchoring means to a seabed and/or electrically transmitted rotating means, and/or rotating means for mooring comprising a swivel joint to which the moorings of the platform itself are joined.

8. The floating platform according to claim 7, wherein the anchoring means to the seabed comprise at least three mooring lines with their corresponding fastening means selected from anchors, concrete blocks, and piles for the fastening thereof to the seabed.

9. The floating platform according to claim 7, wherein the electrically transmitted rotating means comprise a swivel connector positioned on the buoy or on the platform itself and a cable coming from the seabed and reaching the platform itself.

* * * * *